United States Patent
Grubb et al.

(10) Patent No.: US 6,854,505 B2
(45) Date of Patent: *Feb. 15, 2005

(54) SPEED REDUCER FOR RETRACTABLE SCREEN SYSTEMS

(75) Inventors: Darryl L. Grubb, Scottsdale, AZ (US); Dennis A. Grubb, Orange, CA (US); Ronald H. Scott, Phoenix, AZ (US)

(73) Assignee: Clear View Products, Inc., Anaheim, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/617,944

(22) Filed: Jul. 11, 2003

(65) Prior Publication Data

US 2004/0103999 A1 Jun. 3, 2004

Related U.S. Application Data

(63) Continuation of application No. 09/909,028, filed on Jul. 19, 2001, now Pat. No. 6,591,890.

(51) Int. Cl.[7] .................................................. E06B 9/56
(52) U.S. Cl. ....................................... 160/296; 160/291
(58) Field of Search ................................ 160/296, 291, 160/292, 293, 294, 305

(56) References Cited

U.S. PATENT DOCUMENTS

| | | | | |
|---|---|---|---|---|
| 3,700,363 A | * | 10/1972 | Sorensen et al. | 418/270 |
| 3,845,623 A | * | 11/1974 | DeLancey | 60/425 |
| 3,987,874 A | * | 10/1976 | Fuehrer et al. | 188/296 |
| 4,051,931 A | * | 10/1977 | Vignon | 188/296 |
| 4,116,318 A | * | 9/1978 | Crisenbery et al. | 192/58.7 |
| 4,331,223 A | * | 5/1982 | Charlat et al. | 188/294 |
| 4,535,829 A | * | 8/1985 | Fukuchi | 160/291 |
| 4,608,823 A | * | 9/1986 | Maze | 60/361 |
| 5,655,881 A | * | 8/1997 | Tanaka et al. | 416/180 |
| 6,059,008 A | * | 5/2000 | Yoshida et al. | 160/296 |
| 6,082,432 A | * | 7/2000 | Kissinger | 160/290.1 |
| 6,155,328 A | * | 12/2000 | Welfonder | 160/313 |
| 6,591,890 B1 | * | 7/2003 | Grubb et al. | 160/296 |
| 2001/0042346 A1 | * | 11/2001 | Brioschi | 49/447 |
| 2003/0051828 A1 | * | 3/2003 | Schmidt | 160/238 |

FOREIGN PATENT DOCUMENTS

JP         9-67987      * 7/1995  ............. 160/296 X

\* cited by examiner

*Primary Examiner*—Bruce A. Lev
(74) *Attorney, Agent, or Firm*—Fulwider Patton Lee & Utecht, LLP.

(57) ABSTRACT

A retractable screen mechanism is disclosed for covering an opening. The retractable screen mechanism comprises two tracks mounted on opposing sides of the opening. A screen comprises a screen material mounted on a frame having two flexible opposing sides corresponding to and adapted to engage the two tracks. A spool mechanism extends between the flexible opposing sides and engages a third side of the frame. The screen winds up on the spool mechanism. The spool mechanism is biased to the wind up position. The spool mechanism has a speed reducer which comprises a resistance structure moving through a viscous fluid to reduce the speed of the biased screen when moving to the wind up position.

11 Claims, 3 Drawing Sheets

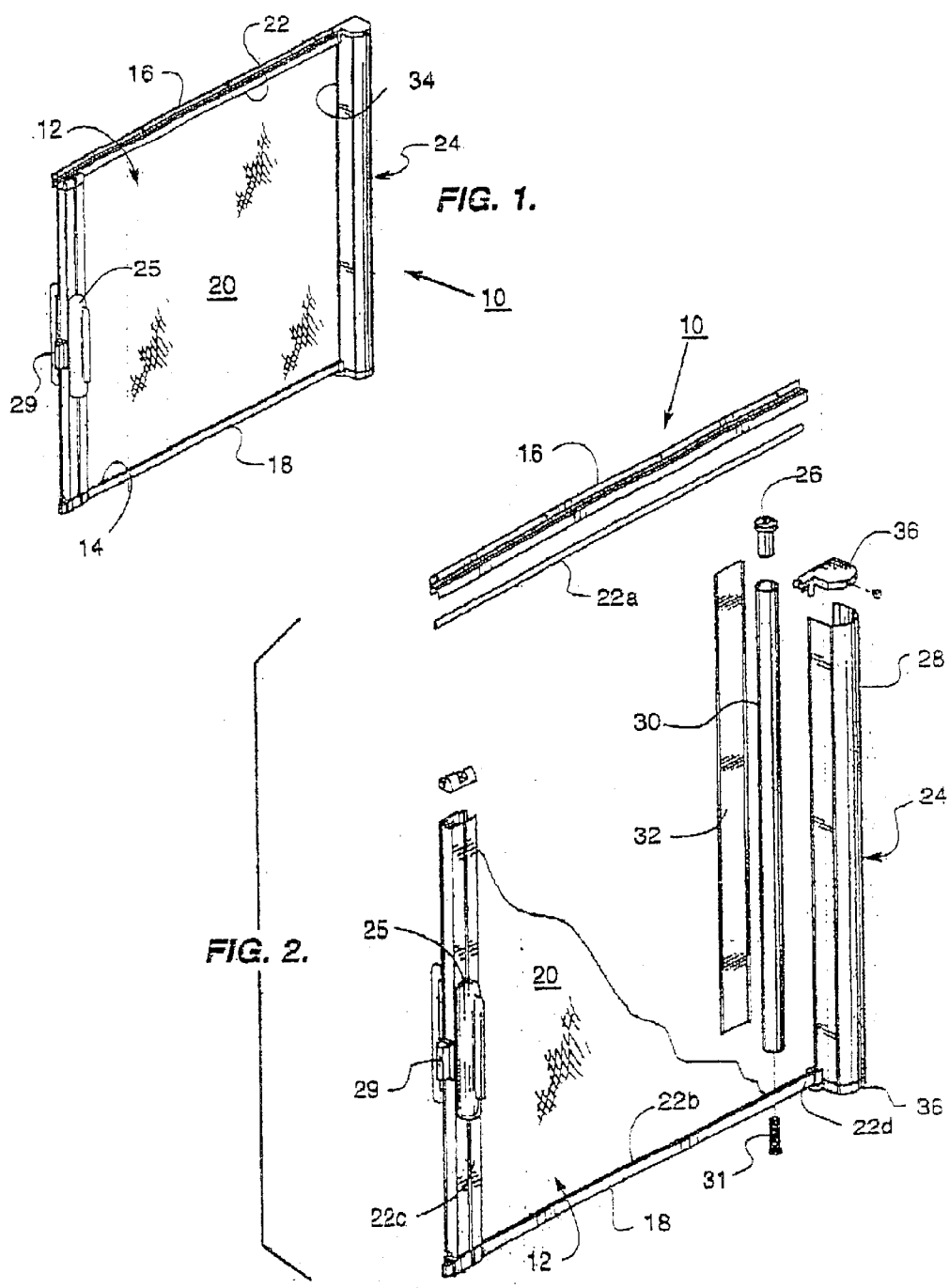

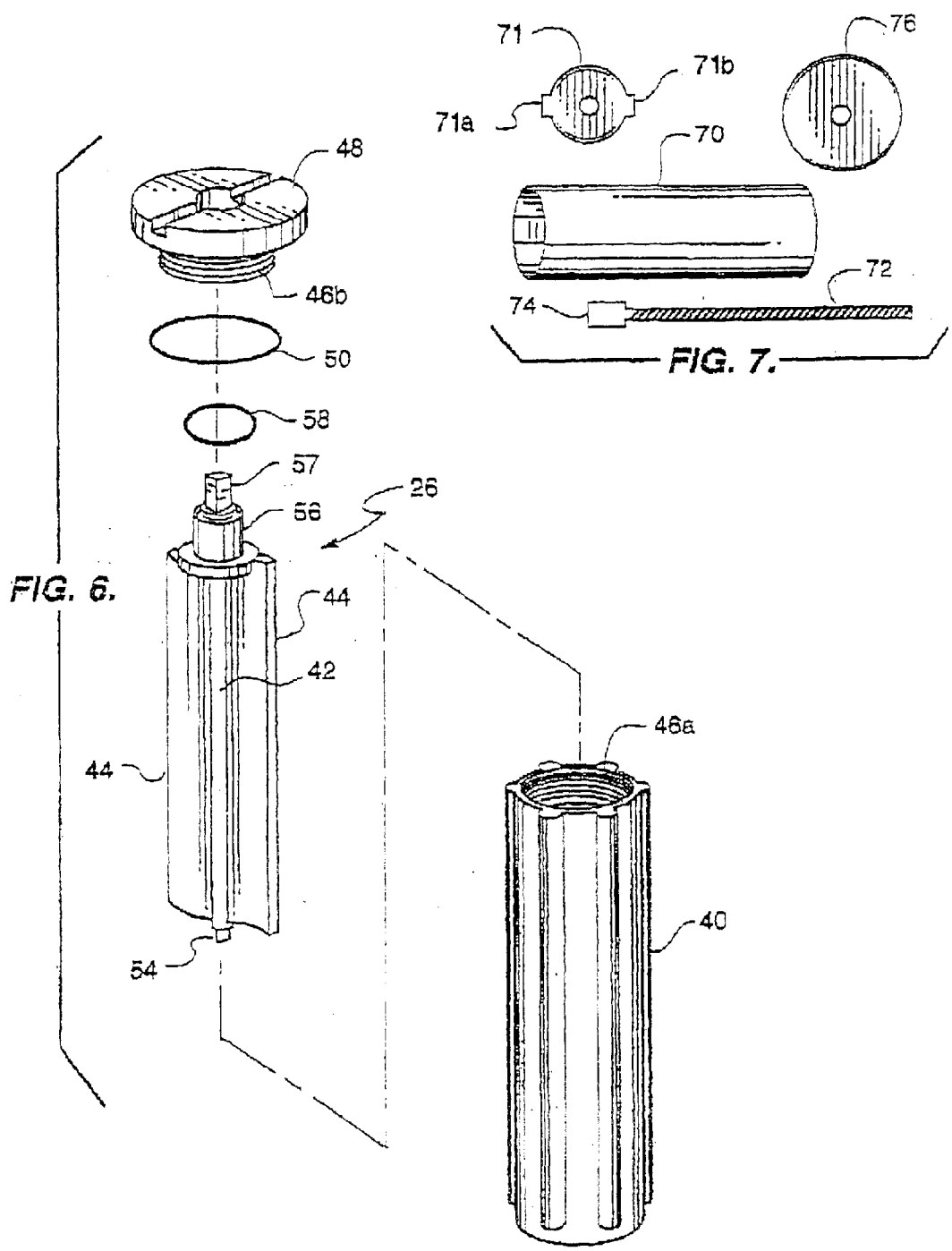

SPEED REDUCER FOR RETRACTABLE SCREEN SYSTEMS

This is a continuation application of U.S. Ser. No. 09/909,028, now U.S. Pat. No. 6,591,890, entitled Speed Reducer for Retractable Screen Systems, filed on Jul. 19, 2001, which is incorporated herein by reference in its entirety.

TECHNICAL FIELD

This invention relates generally to the field of speed reducers used to slow movement, and, more particularly, to a speed reducer for a retractable doors and windows or any other retractable device used to control light and movement of people and/or insects.

BACKGROUND OF THE INVENTION

Retractable screen systems have become very popular in recent years. Such systems provide a screen which is typically extended and latched to cover and opening such as a door or a window. These systems employ a tracks to guide the screen and provide a seal against the elements. The screens are made of a flexible material mounted on a ridged frame adapted to engage the tracks but which allow the screen to be wound up on a spool when not in use. This provides more compact storage that either previously available sliding screens or hinged screen doors of the even earlier prior art.

However, the present day systems employ spools which are spring loaded and biased to the closed position. Thus, once the screen is unlatched, it will rewind to the spool automatically. Unfortunately, such spring loaded systems rewind very quickly and sometimes painfully catch fingers or other extremities. Thus, there is a need for a mechanism to reduce the retraction speed of such systems to avoid such difficulties.

The present invention meets this need.

SUMMARY OF THE INVENTION

It is an object of this invention to provide a speed reducer for a retractable doors and windows or any other retractable device used to control light and movement of people and/or insects.

Further objects and advantages of the invention will become apparent as the following description proceeds and the features of novelty which characterize this invention will be pointed out with particularly in the claims annexed to and forming a part of this specification.

BRIEF DESCRIPTION OF THE DRAWINGS

The present invention may be more readily described by reference to the accompanying drawings in which:

FIG. 1 is a perspective view of a screen system in a closed position;

FIG. 2 is an exploded perspective view of a screen system employing the present invention;

FIG. 6 is an exploded view of the speed reducer of FIG. 3; and

FIG. 7 is an alternate embodiment of the present invention.

DESCRIPTION OF THE PREFERRED EMBODIMENT

Figure 3:
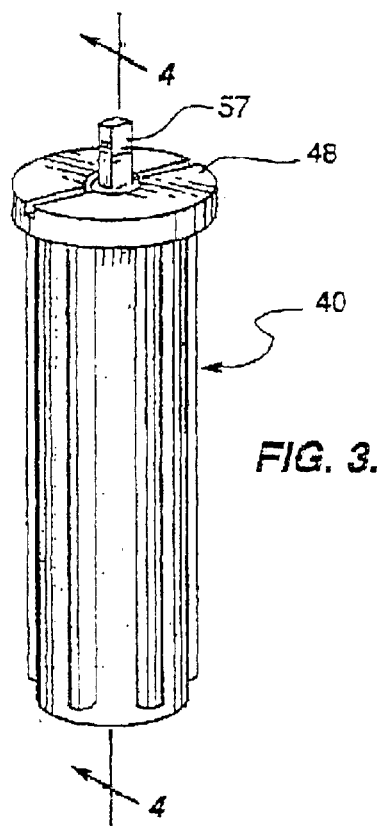
FIG. 3 is a close up view of one embodiment of a speed reducer of the present invention.
Figure 4:
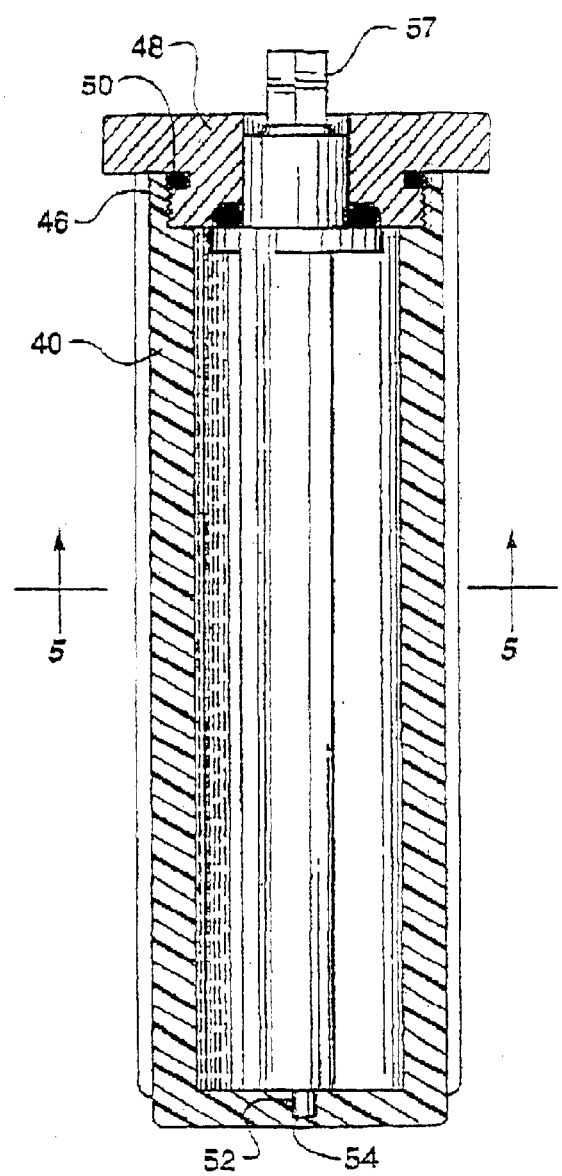
FIG. 4 is a cross sectional view of the embodiment of FIG. 3 taken along lines 4—4.

As best seen in FIGS. 2–6, the present invention is a speed reducer 26 incorporated into a screen system 10. A screen system 10 in an extended position is best seen in FIG. 1. Screen system 10 comprises a screen 12 which is typically extended and latched to cover and opening 14 such as a door or a window. Screen system 10 employs a first track 16 and an opposing second track 18 which are adapted to guide screen 12 and provide a seal against the elements.

Screen 12 is generally comprised of are made of a flexible screen material 20, for example, a fabric, mounted on a frame 22 having a flexible first side 22a and a flexible opposing second side 22b adapted to engage tracks 16 and 18. Frame 22 and material 20 allow screen 12 to be wound up on a spool mechanism 24 when not in use. The ability to wind up screen 12 provides for more compact storage than either previously available slidings screens or hinged screen doors of the even earlier prior art. A latch mechanism 25 mounted to one side 22c of frame 22, side 22c extending between sides 22a and 22b, engages a corresponding latching mechanism 29 mounted on the corresponding side of opening 14 holds screen 12 in the extended or unwound position illustrated in FIG. 1 when desired.

To move screen 12 to a rewound position whereby opening 14 is uncovered, latch mechanism 25 is disengaged by the user. Spool mechanism 24 is biased to the rewound position whereby once screen 12 is unlatched, screen 12 rewinds to spool mechanism 24 automatically.

As shown in FIG. 2, spool mechanism 24 comprises an elongated housing 28 having a U-shaped profile and a rotating axle 30 contained therein. A plate 32 covers the open side end of housing 28 except for an slot 34 while two caps 36 provide and support therefor. A side 22d of frame 22 opposite side 22c is attached to axle 20 while screen 12 extends through slot 34. Latch mechanism 25 itself prevents screen 12 from being completely rewound onto axle 30. Side 22c is, preferably, adapted to cover slot 34 to prevent entry of dirt, insects and the like when screen 12 is in rewound position.

Axle 30 engages a constant tension spring mechanism 31 at one end thereof. As discussed, spring mechanism 31 is biased to hold screen 12 in the rewound position. The mechanisms discussed to this point are well known in the prior art.

The present invention is the addition of a speed reducer mechanism 26 at the end of axle 30 opposite spring mechanism 31. In the prior art, speed reducer mechanism 26 is normally a bushing or the like (not shown) which allows for free rotation of axle 30 without speed reduction. The heart of the present invention is the use of the structure moving through a viscous fluid to reduce the speed of the screen 12 movement.

Turning now to FIGS. 3–6, the presently preferred embodiment of speed reducer mechanism 26 comprises a cylindrical, hollow ribbed housing 40 having a shaft 42 extending coaxially and rotatable mounted therewithin. A plurality of vane blades 44 extending laterally from shaft 42. Housing 40 includes threading 46a at one open end thereof which is adapted to mate with corresponding threading 46b on a cap 48 to close said open end. An o-ring 50 provides a seal between housing 40 and cap 48.

At the opposing end of housing 40, a recess 52 is adapted to receive an end 54 f shaft 42 and allow shaft 42 to rotate with respect to housing 40. A bushing 56 is mounted to the opposite end of shaft 42 and extends upwardly through cap 48. O-ring 58 in combination with cap 48 and bushing 56 provides a liquid proof seal between the interior and exterior of housing 40 while allowing shaft 42 to rotate with respect to housing 40. An upper end 57 of shaft 42 extends upwardly from housing 40.

Figure 5:
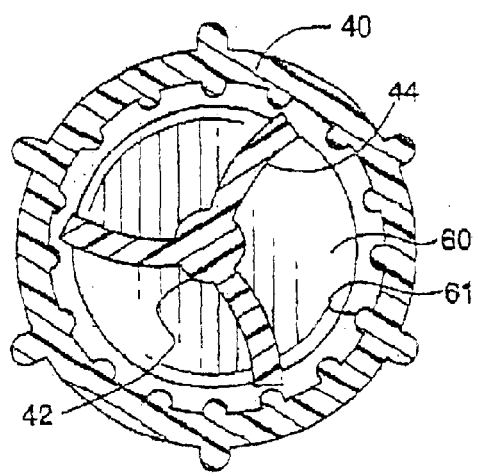
FIG. 5 is a cross sectional view of the embodiment of FIG. 4 taken along lines 5—5.

Housing 40 is filled with a liquid substance, preferably a viscous material 60 such as a hydraulic oil. The combination of vane blades 44 and viscous material 60 provides resistance to rotation of shaft 42 and housing 40. Further resistance is provided in the most preferred embodiment by adding ribs 61 extending inwardly from housing 40 as best seen in FIG. 5. Ribs 61 add turbulence to the flow of the viscous material 60 which increases the resistance thereof. To further add resistance, ribs 61 are bent slightly in one direction of the other.

As best seen in FIG. 5, vane blades 44 are not radially oriented but instead curve away from that radial orientation in the clockwise direction as viewed in FIG. 5. The curvatures of blades 44 allows less turbulent hydraulic flow when vane blades 44 rotate in a counterclockwise direction as opposed to a clockwise direction. In the preferred embodiment, the counterclockwise direction is used to move screen 12 from the rewound position to the extended position while the added resistance is used to impede the movement of screen 12 from the extend position to the rewound position against the pull of spring 31.

Housing 40 is, preferably, mounted to the interior of axle 30 and rotates therewith. Upper end 57 is fixedly mounted to cap 36 and does not rotate. Thus, housing 40 and axle 30 rotate about a fixed shaft 42 to provide the reduction in speed.

Turning now to FIG. 7, an alternate embodiment of the present invention is illustrated. This embodiment includes a housing 70 having a cap 71 at one end thereof and a jackscrew 72 rotatably received within housing 70 with an upper end 74 extending through cap 72. A disk 76 having two tabs which ride in tracks along the interior of housing 70 is rotatably received on jackscrew 72 and, as jackscrew 72 rotates, travels upwardly and downwardly thereon depending upon the rotational direction of jackscrew 72. Housing 70 is filled with viscous material 60 providing resistance to the travel of disk 76 therethrough.

Although only certain embodiments have been illustrated and described, it will be apparent to those skilled in the art that viscous changes and modifications may be made therein without departing from the spirit of the invention or from the scope of the appended claims.

What is claimed is:

1. A speed reducer for use in a retractable screen system having an elongated axle extending between a pair of opposing end caps with at least a portion of the axle being coupled to one side of a retractable screen, the axle being biased to a retracted position and operable to wind the screen onto the axle's circumference to a retracted position or unwind so the screen may be extended, said speed reducer comprising:

a hollow cylindrical housing defining a speed control chamber and having a closed end and an opposing end with a central aperture, said housing further including an outer surface for coupling to a first end of said axle and an inner surface with a plurality of inwardly projecting rib elements;

an elongated shaft rotatably engaged with said housing, said shaft including one end projecting through said central aperture for engaging an end cap proximate the first end of the axle to fix rotation of said shaft and a plurality of outwardly extending rib elements inserted into said speed control chamber, said shaft being smaller in diameter than said inner surface of said housing to form a fluid receiving gap; and a braking fluid at least partially filling in said fluid receiving gap and in fluid communication with said inwardly and outwardly projecting rib elements, said braking fluid inhibiting free rotation of said housing relative to said shaft whereby said one end of said shaft may be connected to the end cap proximate the first end of the axle and said housing coupled to said axle to control the winding speed of the screen as the axle turns relative to said shaft.

2. The speed reducer as recited in claim 1 wherein:

said outer surface of said housing includes outwardly projecting rib elements for engaging an interior surface of a hollow end of the axle to resist turning in relation to the axle.

3. The speed reducer as recited in claim 2 wherein:

at least some of said outwardly projecting rib elements project at a skewed angle to the outer circumference of said housing.

4. The speed reducer as recited in claim 1 wherein:

an end cap includes said central aperture and is attached to said housing to cooperate with said housing to form said speed control chamber.

5. The speed reducer as recited in claim 1 wherein:

said braking fluid is a viscous material.

6. The speed reducer as recited in claim 5 wherein:

said viscous material is a hydraulic fluid.

7. The speed reducer as recited in claim 1 wherein:

said speed control chamber is sealed.

8. The speed reducer as recited in claim 1 wherein:

said outwardly projecting rib elements are rigid and extend outwardly and circumferentially in relation to said shaft.

9. The speed reducer as recited in claim 1 wherein:

said outwardly projecting rib elements curve outwardly and radially in a uniform direction.

10. The speed reducer as recited in claim 1 wherein:

said inwardly projecting rib elements include rounded innermost regions.

11. A speed reducer for use in a retractable screen system having an elongated rolled up screen housing terminating in a pair of opposing end caps and including an elongated axle biased to a wind up position with a hollow end positioned proximate one of the end caps and a second end positioned proximate the other of the end caps, the axle projecting longitudinally between the end caps with a portion of the axle being coupled to one side of a screen and operable to rotate to wind the screen about the axle's circumference within the screen housing or unwind the screen, said speed reducer comprising:

a elongated hollow cylindrical housing including an outer surface with a plurality of outwardly extending rib elements for slidable engagement with an interior surface of the hollow end of the axle to restrict the housing from rotating relative to the axle, said housing further including an inner surface with a plurality of inwardly extending semi-cylindrical ridges and an open end with a first fastening element;

a cap having a central aperture and including a second fastening element engaged with said first fastening element and cooperating with said housing to form a speed control chamber;

a shaft including a central post with one end extending through said cap for engaging said end cap, said post including a set of three rigid vanes projecting outwardly and circumferentially in relation to said post, said vanes extending sufficiently outwardly to slide across said ridges as said shaft rotates in said housing; and a viscous fluid in said speed control chamber and filling in a region between said post and said inner surface of said housing whereby, upon engagement of said end of said post with said end cap and said housing with said hollow end of said axle, the rotational speed of said axle in relation to said shaft may be reduced.

* * * * *

(12) EX PARTE REEXAMINATION CERTIFICATE (9099th)
United States Patent
Grubb et al.

(10) Number: US 6,854,505 C1
(45) Certificate Issued: *Jun. 26, 2012

(54) SPEED REDUCER FOR RETRACTABLE SCREEN SYSTEMS

(75) Inventors: Darryl L. Grubb, Scottsdale, AZ (US);
Dennis A. Grubb, Orange, CA (US);
Ronald H. Scott, Phoenix, AZ (US)

(73) Assignee: Clear View Products, Southeast, Inc., Jacksonville, FL (US)

Reexamination Request:
No. 90/011,353, Nov. 23, 2010

Reexamination Certificate for:
Patent No.: 6,854,505
Issued: Feb. 15, 2005
Appl. No.: 10/617,944
Filed: Jul. 11, 2003

( * ) Notice: This patent is subject to a terminal disclaimer.

Related U.S. Application Data

(63) Continuation of application No. 09/909,028, filed on Jul. 19, 2001, now Pat. No. 6,591,890.

(51) Int. Cl.
*E06B 9/56* (2006.01)
*E06B 9/80* (2006.01)

(52) U.S. Cl. .......................................... 160/296; 160/291
(58) Field of Classification Search .................. 188/290; 403/298; 160/296
See application file for complete search history.

(56) References Cited

To view the complete listing of prior art documents cited during the proceeding for Reexamination Control Number 90/011,353, please refer to the USPTO's public Patent Application Information Retrieval (PAIR) system under the Display References tab.

*Primary Examiner* — Robert M. Fetsuga

(57) ABSTRACT

A retractable screen mechanism is disclosed for covering an opening. The retractable screen mechanism comprises two tracks mounted on opposing sides of the opening. A screen comprises a screen material mounted on a frame having two flexible opposing sides corresponding to and adapted to engage the two tracks. A spool mechanism extends between the flexible opposing sides and engages a third side of the frame. The screen winds up on the spool mechanism. The spool mechanism is biased to the wind up position. The spool mechanism has a speed reducer which comprises a resistance structure moving through a viscous fluid to reduce the speed of the biased screen when moving to the wind up position.

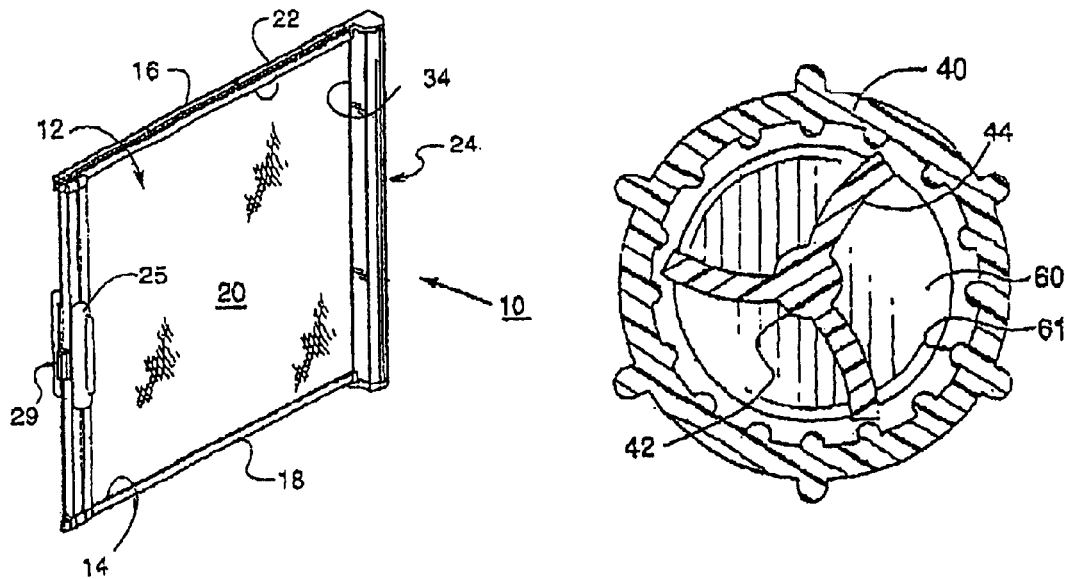

US 6,854,505 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 6, and 8-11 are determined to be patentable as amended.

Claims 2-5 and 7, dependent on an amended claim, are determined to be patentable.

New claim 12 is added and determined to be patentable.

1. A speed reducer for use in a retractable screen system having an elongated axle extending between a pair of opposing end caps with at least a portion of the axle being coupled to one side of a retractable screen, the axle being biased to a retracted position and operable to wind the screen onto the axle's circumference to a retracted position or unwind so the screen may be extended, said speed reducer comprising:
   a hollow cylindrical housing defining a speed control chamber and having a closed end and an opposing end with a central aperture, said housing further including an outer surface for coupling to a first end of said axle and an inner surface with a plurality of inwardly [projecting] *extending* rib elements;
   an elongated shaft rotatably engaged with said housing, said shaft including one end projecting through said central aperture for engaging an end cap proximate the first end of the axle to fix rotation of said shaft and a plurality of outwardly extending rib elements inserted into said speed control chamber, said shaft being smaller in diameter than said inner surface of said housing to form a fluid receiving gap; and
   a braking fluid at least partially filling in said fluid receiving gap and in fluid communication with said inwardly and outwardly [projecting] *extending* rib elements, said braking fluid inhibiting free rotation of said housing relative to said shaft whereby said one end of said shaft may be connected to the end cap proximate the first end of the axle and said housing coupled to said axle to control the winding speed of the screen as the axle turns relative to said shaft;
   *wherein each of said outwardly extending rib elements defines a curved structure having a concave surface and an opposite convex surface, whereby rotation of said shaft in the direction of the concave surface provides greater resistance to rotation than rotation of said shaft in the direction of the convex surface.*

6. The speed reducer as recited in claim 5 wherein: said viscous material is a hydraulic fluid *that substantially fills the hollow cylindrical housing*.

8. The speed reducer as recited in claim 1 wherein: said outwardly [projecting] *extending* rib elements are rigid and extend outwardly and circumferentially in relation to said shaft.

9. The speed reducer as recited in claim 1 wherein: said outwardly [projecting] *extending* rib elements curve outwardly and radially in a uniform direction.

10. The speed reducer as recited in claim 1 wherein: said inwardly [projecting] *extending* rib elements included rounded innermost regions.

11. A speed reducer for use in a retractable screen system having an elongated rolled up screen housing terminating in a pair of opposing end caps and including an elongated axle biased to a wind up position with a hollow end positioned proximate one of the end caps and a second end positioned proximate the other of the end caps, the axle projecting longitudinally between the end caps with a portion of the axle being coupled to one side of a screen and operable to rotate to wind the screen about the axle's circumference within the screen housing or unwind the screen, said speed reducer comprising:
   a elongated hollow cylindrical housing including an outer surface with a plurality of outwardly [extending] *projecting* rib elements for slidable engagement with an interior surface of the hollow end of the axle to restrict the housing from rotating relative to the axle, said housing further including an inner surface with a plurality of inwardly extending semi-cylindrical ridges and an open end with a first fastening element;
   a cap having a central aperture and including a second fastening element engaged with said first fastening element and cooperating with said housing to form a speed control chamber;
   a shaft including a central post with one end extending through said cap for engaging said end cap, said post including a set of three rigid vanes [projecting] *extending* outwardly and circumferentially in relation to said post, said vanes extending sufficiently outwardly to slide across said ridges as said shaft rotates in said housing; and
   a viscous fluid in said speed control chamber and filling in a region between said post and said inner surface of said housing whereby, upon engagement of said end of said post with said end cap and said housing with said hollow end of said axle, the rotational speed of said axle in relation to said shaft [may be] *is* reduced;
   *each of said vanes extending outwardly and circumferentially in relation to said shaft, and having a curvature causing greater resistance to rotation in one rotational direction than in an opposite rotational direction.*

12. *A speed reducer for use in a retractable screen system having an elongated axle extending between a pair of opposing end caps with at least a portion of the axle being coupled to one side of a retractable screen, the axle being biased to a retracted position and operable to wind the screen onto the axle's circumference to a retracted position or unwind so the screen may be extended, said speed reducer comprising:*
   *a hollow cylindrical housing defining a speed control chamber and having a closed end and an opposing end with a central aperture, said housing further including an outer surface for coupling to a first end of said axle and an inner surface with a plurality of inwardly extending rib elements;*
   *an elongated shaft rotatably engaged with said housing, said shaft including one end projecting through said central aperture for engaging an end cap proximate the first end of the axle to fix rotation of said shaft and a plurality of outwardly extending rib elements inserted into said speed control chamber, said shaft being smaller in diameter than said inner surface of said housing to form a fluid receiving gap; and* a braking fluid at least partially filling in said fluid receiving gap and in fluid communication with said inwardly and outwardly extending rib elements, said braking fluid inhibiting free rotation of said housing relative to said shaft whereby said one end of said shaft may be connected to the end cap proximate the first end of the axle and said housing coupled to said axle to control the winding speed of the screen as the axle turns relative to said shaft;

wherein each of said outwardly extending rib elements has a curvature causing greater resistance to rotation in one rotational direction than in an opposite rotational direction.

\* \* \* \* \*